Feb. 24, 1925.

R. B. HAMMER

BOX SEALING MACHINE

Filed March 20, 1924    2 Sheets-Sheet 1

1,527,796

INVENTOR
R.B. HAMMER
BY Earl M. Sinclair
ATTORNEY

Feb. 24, 1925.

R. B. HAMMER

BOX SEALING MACHINE

Filed March 20, 1924    2 Sheets-Sheet 2

1,527,796

INVENTOR
R. B. HAMMER
BY Earl M. Sinclair
ATTORNEY

Patented Feb. 24, 1925.

1,527,796

UNITED STATES PATENT OFFICE.

RICHARD BERNICE HAMMER, OF AMES, IOWA.

BOX-SEALING MACHINE.

Application filed March 20, 1924. Serial No. 700,510.

*To all whom it may concern:*

Be it known that I, RICHARD B. HAMMER, a citizen of the United States of America, and resident of Ames, Story County, Iowa, have invented a new and useful Box-Sealing Machine, of which the following is a specification.

The object of this invention is to provide an improved construction for a machine for automatically closing and sealing pasteboard, straw-board or the like boxes and cartons.

A further object of this invention is to provide improved means for mounting boxes to be sealed on an endless carrier.

A further object of this invention is to provide an improved interchangeable and adjustable backing plate for the flaps to be sealed.

A further object of this invention is to provide improved means for adjusting the machine for operation upon boxes or cartons of various sizes.

With these and other objects in view, my invention consists in the construction, arrangement and combination of elements hereinafter set forth, pointed out in my claims and illustrated by the accompanying drawings, in which—

Figure 1:
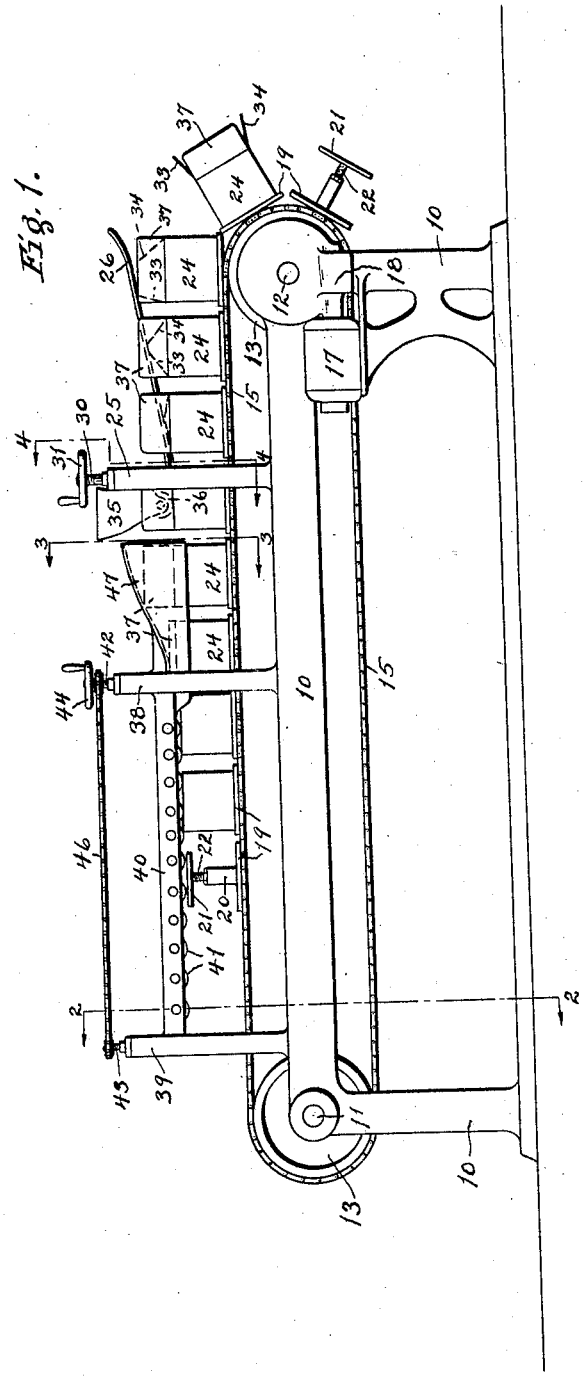
Figure 2:
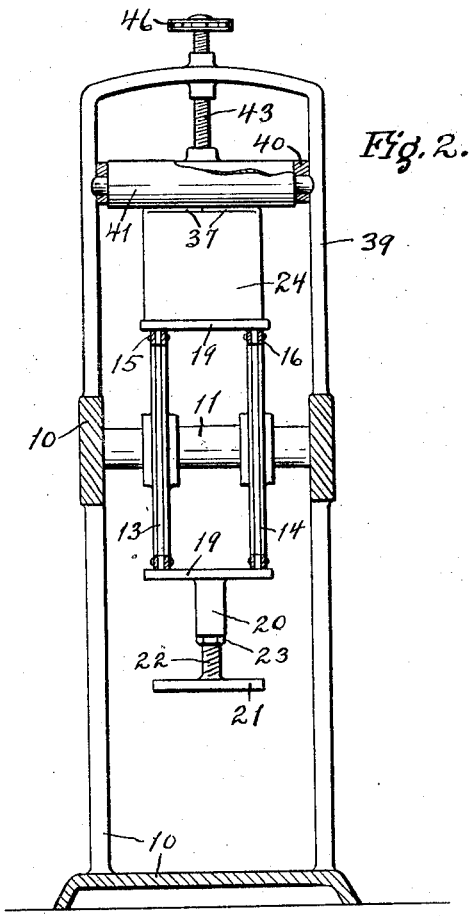
Figure 3:
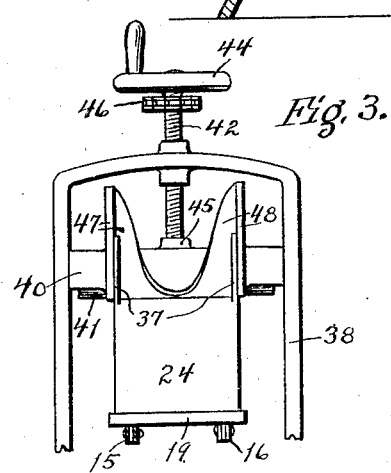
Figure 4:
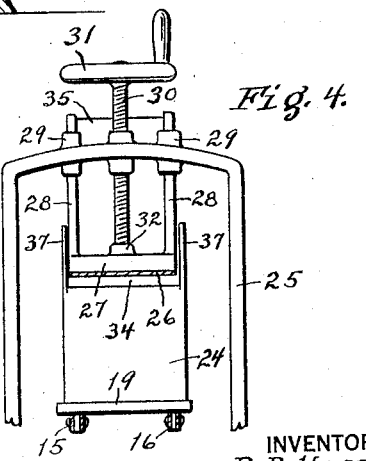

Figure 1 is a side elevation illustrating my improved machine. Figure 2 is a vertical section on the line 2—2 of Figure 1. Figures 3 and 4 are detail sections on the respective lines 3—3 and 4—4 of Figure 1. Figures 2, 3 and 4 are on an enlarged scale.

In the construction of the machine as shown the numeral 10 designates a suitable frame, which may be of any desired form, shape, size and construction. In the respective ends of the frame 10 are journaled transversely arranged shafts 11, 12, on each of which is mounted a pair of sprocket wheels 13, 14, over which extend endless sprocket chains 15, 16, or link belt chains of common form. One of the shafts, in this instance 12, is driven from an electric motor 17 by means of belt, chain or gearing which may be contained in a housing 18, the specific operative connections being immaterial. Closely spaced on the endless chain belt 15, 16 are a plurality of base plates 19, which are fastened at their median lines only to said chain belt in order that they may readily travel around the gears 13, 14. The base plates 19 are of a size large enough to accommodate the largest box or carton for which the machine is designed, and are provided in any desired quantity, a portion only of said plates being shown in the drawing. An internally threaded pipe section or tube 20 is formed on or rigidly fixed to and rises from the central portion of each base plate 19. A backing plate 21 is adapted to be superposed above and adjustably mounted relative to each base plate 19. Each backing plate 21 has fixed to and centrally of its lower face a stem 22, threaded and adapted to be received adjustably within a tube 20, whereby the backing plate is mounted in a position parallel with and spaced from the base plate, a lock nut 23 being provided on each stem to secure and lock the adjustment when made manually. The backing plates 21 correspond substantially to the cross-sectional area of a box or carton such as 24 adapted to be operated upon, and the adjusted spacing of the upper surface of the backing plates 21 from the upper surface of the base plate corresponds substantially to the vertical dimension of such box or carton. The box or carton to be operated upon, and carried by the devices just described, is presumed to be empty and have its flaps open at both ends, the carton being mounted manually on a base plate 19 in such a position as to enclose the tube 20, backing plate 21 and stem 22, said backing plate first having been adjusted to the required position that it may serve as a backing for the flaps when they are turned in and pressure is applied to seal them; and any suitable alteration or modification, or other means, may be employed for closing and sealing the opposite end flaps of the cartons after they have been filled.

An arched frame 25 is mounted transversely on and rises from the top of the frame 10, preferably near the loading end thereof, and said frame spans or embraces the upper run of the link belt or chains 15, 16 and the plates and other members carried thereby. A curved plate 26 is fixed at one end to a bar 27 which is arranged within the arched frame 25, and said bar is carried by guides and supports 28 extending slidably through bearings 29 formed in the cross member of said arched frame. A screw 30 is threaded through the central portion of the cross member of the arched frame 25, and has fixed to its upper end a hand wheel 31 by means of which it may be rotated manually. At its lower end the screw 30 has a swivel connection at 32 with the bar 27, whereby said bar and the members carried thereby may be raised and lowered by rotating said screw, the guides 28 moving freely in the slide bearings 29. The curved plate 26 projects from the bar 27 toward the loading end of the frame, and is curved or bent upwardly between its ends. It is the function of the curved plate 26 to engage the forward end flaps such as 33, or cartons 24 mounted on the endless carrier, as said carrier moves the cartons toward the arched frame 25, and by such engagement to depress and close said forward end flaps and hold them against the backing plates 21 as the cartons pass beneath said arched frame; the supporting bar 27 having been adjusted, by means of the screw and hand wheel 31 thereon, to a position spaced slightly above the backing plates. Thus the forward end flaps 33 are gradually moved to closed position, and held in such position, by an engagement of the curved plate 26 therewith, as illustrated in Figure 1. The rearward flaps, such as 34, are first manually depressed by the operator as the cartons approach the curved plate 26, after which they are engaged by said plate and further depressed to closed position, and held in such position by said plate as the cartons pass beneath the arched frame. Fixed to the forward side of the bar 27, oppositely to the curved plate 26, is a hopper 35 adapted to contain glue or paste for sealing the flaps. The hopper 35 is provided with an aperture or slot at its lower end from which the adhesive substance is fed, and with a roller 36 (dotted lines Figure 1) journaled adjacent said slot which receives such substance in any suitable manner and distributes or spreads it to and upon the depressed flaps 33, 34 as the cartons pass beneath it. The hopper and roller are adjusted with the bar and other members by means of the screw 30, so that said roller is always in position for rolling contact with the upper surface of the end flaps. The curved plate 26, hopper 35 and roller 36 are sufficiently narrow that the side flaps such as 37 of the cartons may pass on opposite sides of them in substantially upright position.

Forwardly of the arched frame 25 are the other spaced arched frames 38, 39, fixed to and rising from the top of the main frame 10, between which the upper run of the endless carrier, and members carried thereby, are adapted to pass. A horizontal frame 40, containing a bed of rollers 41 transversely arranged, is mounted within the arched frames 38, 39 and spaced above the endless carrier a variable distance. The roller frame 40 is suspended from and vertically adjustable by means of screws 42, 43 threaded through the cross members of the arched frames 38, 39 respectively, and one of said screws, in this instance 42, is provided at its upper end with a hand wheel 44 by which it may be manually rotated, said screws being provided at their lower ends with swivel connections, at 45, with the frame of said roller bed. The screws 42, 43 preferably are operatively connected by sprocket gearing 46, or similar means, for conjunctive rotation when the hand wheel 44 is operated, so that both ends of the roller bed are raised or lowered simultaneously and it is maintained in a horizontal position. Curved side plates 47, 48 are mounted on one end portion of the roller frame 40 and project through the arched frame 38 toward the arched frame 25. The curved side plates 47, 48 are spaced apart sufficiently to receive between them the side flaps 37 of the moving cartons, and are curved downwardly and inwardly in such manner as to engage and move said side flaps to closed or horizontal position as the cartons pass between them, depressing the said side flaps to engagement with the supper surface of the end flaps 33, 34 which have been coated with adhesive. In this position the cartons pass beneath the bed of rollers 41, which engage the upper surfaces of the closed side flaps 37 and exert pressure thereon during continued travel of the cartons toward the discharge end of the frame, causing said flaps to be sealed. The cartons 24 with their flaps sealed may be removed manually from the base and backing plates at the discharge end of the frame, after passing from beneath the roller bed.

I claim as my invention—

1. A box-sealing machine, comprising a frame, an endless carrier mounted for travel therein, an arched frame surmounting the main frame, through which said carrier is adapted to pass, means for mounting boxes on said carrier, a member vertically adjustable in said arched frame, a curved plate carried by said member and adapted to depress flaps of said cartons as they pass beneath said arched frame, and a hopper carried by said member and adapted to contain an adhesive to be applied to the upper surface of the depressed flaps.

2. A box-sealing machine, comprising a frame, an endless carrier mounted for travel therein, means for mounting boxes on said carrier, a bar vertically adjustable in said arched frame, a curved plate carried by said bar adapted to depress flaps of cartons on said carrier as they pass through said arched frame, a hopper carried by said bar and adapted to contain adhesive to be applied to the upper surfaces of said depressed flaps, a second arched frame beyond the first, and curved members carried by said second arched frame adapted to depress other flaps of the cartons upon the adhesive-coated surfaces of the first mentioned flaps.

3. A box-sealing machine, comprising a frame, an endless carrier mounted for travel therein, means for mounting boxes on said carrier, an arched frame, a screw threaded in said arched frame, a supporting bar carried by said screw, a curved plate carried by said bar adapted to engage and depress flaps of said boxes as they pass through said arched frame, a hopper carried by said bar adapted to contain an adhesive to be applied to upper surfaces of the depressed flaps, means for depressing other flaps of said boxes upon the adhesive-coated flaps, and means for applying pressure to the last-mentioned flaps.

4. A box-sealing machine, comprising a frame, an endless carrier mounted for travel therein, means for mounting boxes on said carrier, an arched frame, a bar mounted for vertical adjustment in said arched frame, a curved plate carried by said bar and adapted to engage and depress flaps of boxes on said carrier, a hopper on said bar adapted to contain adhesive to be applied to upper surfaces of the depressed flaps, a second arched frame beyond the first, curved plates carried by the second arched frame adapted to engage other flaps of the boxes upon the adhesive-coated flaps, and a roller bed connected with the second arched frame adapted to exert pressure on the flaps as the boxes pass beneath it.

5. A box-sealing machine, comprising a frame, an endless carrier mounted for travel therein, means for mounting boxes on said carrier, an arched frame through which said boxes are adapted to pass on said carrier, a curved plate projecting from said arched frame adapted to engage and depress flaps of said boxes, a hopper adapted to contain an adhesive to be applied to upper surfaces of the depressed flaps, a pair of arched frames beyond the first, curved plates on the intermediate arched frame adapted to engage and depress other flaps of said boxes on the adhesive-coated flaps, and a roller bed carried by the intermediate and terminal arched frames adapted to apply pressure upon the flaps as the boxes pass beneath it.

6. In a box-sealing machine, an endless carrier, a series of base plates mounted thereon, an internally threaded tube perpendicular to each base plate, and a backing plate spaced from each base plate and having a stem adapted to be engaged in the threaded tube thereof.

7. In a box-sealing machine, an endless carrier, a base plate thereon adapted to support a carton, an internally threaded tube perpendicular to said base plate, and a backing plate adapted to be received within the carton, said backing plate being formed with a stem adjustably engaged in said threaded tube.

8. A box-sealing machine, comprising a frame, an endless carrier mounted for travel therein, a series of base plates carried by said carrier, a backing plate adjustably spaced from each base plate and of smaller dimension than the same, vertically adjustable means for depressing end flaps of cartons mounted on said carrier, vertically adjustable means for applying an adhesive to the depressed flaps, vertically adjustable means for depressing side flaps of the cartons on the adhesive-coated flaps, and vertically adjustable means for applying pressure to the flaps.

Signed at Ames, in the county of Story and State of Iowa, this 6 day of February, 1924.

RICHARD BERNICE HAMMER.